March 20, 1951 G. F. BELLAIRS ET AL 2,545,642

FINDER FOR AUTOMATIC CARRIER TELEPHONE SYSTEMS

Filed Jan. 24, 1948 2 Sheets-Sheet 1

Inventors
Guy Ffarington Bellairs
John Charles Ireland
by Dezsoe Steinherz
Attorney March 20, 1951 G. F. BELLAIRS ET AL 2,545,642

FINDER FOR AUTOMATIC CARRIER TELEPHONE SYSTEMS

Filed Jan. 24, 1948 2 Sheets-Sheet 2

Inventors
Guy ffarington Bellairs
John Charles Ireland
by Dezsoe Steinherz
Attorney Patented Mar. 20, 1951 2,545,642

UNITED STATES PATENT OFFICE 2,545,642

FINDER FOR AUTOMATIC CARRIER TELEPHONE SYSTEMS

Guy Ffarington Bellairs, London, and John Charles Ireland, Tunbridge Wells, England, assignors to British Telecommunications Research Limited, Taplow, England, a British company Application January 24, 1948, Serial No. 4,145
In Great Britain January 27, 1947

14 Claims. (Cl. 179—15)

Figure 1:
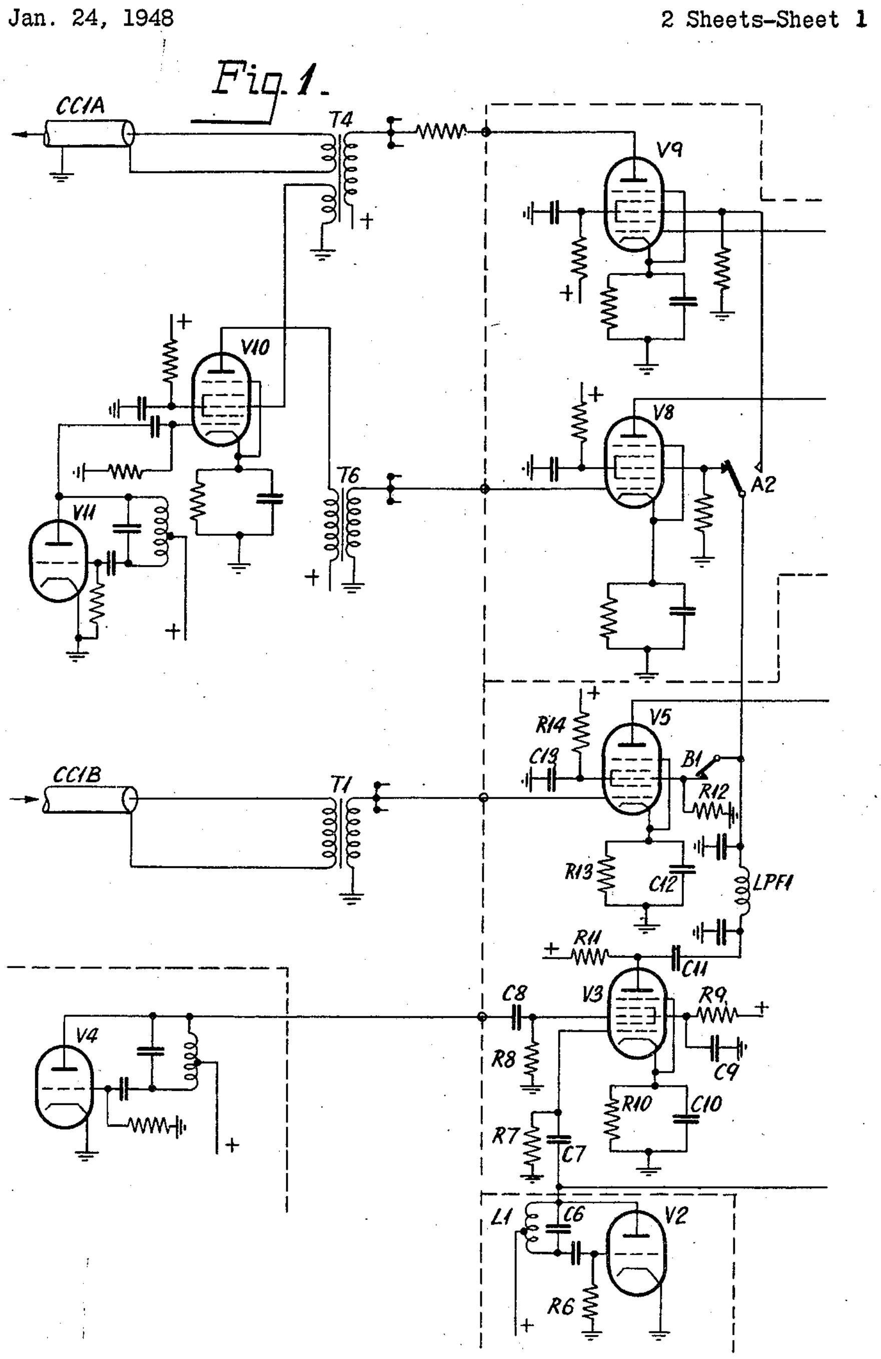

This invention relates to telephone or the like systems of the kind in which each communication channel of a group of communication channels has associated a distinctive wave or waves and is more particularly concerned with an arrangement which may be described as a frequency finder for use in such a system.

According to a feature of the invention in an arrangement for determining the presence of an incoming wave having one of a number of possible constant frequencies a generator is provided which produces waves having a frequency varying over a range and is adapted to be caused to produce a wave of frequency having a definite relation to said constant frequency when the varying frequency or a frequency derived therefrom approaches within a predetermined amount of the frequency of said constant frequency incoming wave.

It may be arranged that frequency variation goes on independently of the reception of an incoming wave or may be started up by the reception of an external stimulus such as may be provided by an incoming wave; or when a number of frequency finders are operating in a group it may be arranged that they are started up in sequence possibly to the extent which is necessary to deal with the number of stimuli which are being received.

The frequency may be varied over the range in a continuous manner, i. e. the frequency varying smoothly or it may be varied over the range in a series of discontinuous steps i. e. jumping from one frequency to another without passing through intermediate frequencies. If the variation is discontinuous the arrest will occur on a fixed frequency which will be within a predetermined amount of the frequency of the incoming wave; whereas if the variation is continuous it will be necessary to arrest the frequency variation and to lock-in or set the sweep frequency at a value separated by the predetermined amount from the frequency of the incoming wave. In a preferred form the predetermined amount is the intermediate frequency of a superheterodyne receiver for which the generator is the local oscillator.

It is possible however to envisage an arrangement in which the arrest of the frequency variation of the generator occurs at a frequency value which is equal to the frequency of the incoming wave in which case the predetermined amount would be zero and the relationship between the frequency of the incoming wave and the subsequent frequency of the generator would be that they were equal.

A further possibility is that the incoming wave may be adapted to produce a control effect on the generator wave when its frequency approaches that of the generator wave or of a wave derived therefrom so their difference approximates to a frequency within the voice frequency ranges.

The frequency variation of the generator may be started up at any point within the range and it may be arranged that on reaching the end frequency of the range the wave of varying frequency is automatically caused to begin to retraverse its frequency range.

When the frequency variation has been arrested certain switch operations may be carried out and any communication transmitted by means of the found frequency may be passed on via the arrangement, which as previously mentioned may be described as a frequency finder.

When the frequency finder is subsequently released it may be arranged to recommence generating a wave of varying frequency either at once or in dependence on an external stimulus. The frequency variation may then stop at the end of the frequency range or recommence at the beginning of the range.

According to a second feature of the invention an arrangement for hunting over a plurality of communication channels on a transmission path or paths in a telephone or like system is characterised by the provision of a generator producing a wave varying in frequency over a predetermined frequency range and arrangements whereby the wave cooperates with waves characterising the conditions of the various channels to produce different control effects according to the conditions on the channels.

Each communication channel may have separate "Go" and "Return" paths or separate "Go" and "Return" frequencies. In the latter case the same or separate paths might be used for the "Go" and the "Return" frequency.

In a preferred arrangement a wave on the "Go" path of a channel is adapted to react with the wave produced by the generator when the frequency of the latter approaches within a predetermined amount of the frequency of the former to cause the generator to produce a wave having a definite frequency relation to the wave on the "Go" path or frequency of the channel. The wave on the "Return" path or frequency may be set up when the generator comes under the control of a wave on the corresponding "Go" path or frequency.

The presence of a wave on the "Return" path or frequency of a channel is adapted to prevent the presence of the wave in the "Go" path or frequency of the channel from being effective for controlling other frequency finders which may be hunting over the communication channels.

It will be understood that the expressions "Go" and "Return" are used merely to distinguish the two channels and that their meaning might be inverted depending on the point of view from which a two-way communication channel is being considered.

With this in mind the wave on the "Go" path of a communication channel may be sent out by a calling substation when initiating a call. Alternatively it may be set up by a calling substation when controlling the setting up of a call. Thus if two of the arrangements described which may be called frequency finders were suitably connected back-to-back the first could pick up a call from a calling substation, the substation could then select a characteristic frequency of a wanted substation and the second frequency finder could then find the characteristic frequency which had been selected.

A further arrangement would be to have the wave on the "Go" path or frequency of a communication channel sent out when the channel was free. Thus a frequency finder hunting over a group of communication channels to extend a call in a forward direction would find a free channel by receiving the corresponding wave on the "Go" path or frequency.

According to a third feature of the invention an arrangement for hunting over a plurality of communication channels in a telephone or like system wherein the condition of each channel is indicated by the presence or absence of a wave or waves distinctive of the channel comprises two wave testing devices for successively testing said channels one of which tests for the presence of a "calling" or "disengaged" wave and the other tests for the presence of a corresponding busy wave and means operative for seizing a communication channel being tested only if a response is obtained from the "calling" or "disengaged" wave testing device and not from the "busy" wave testing device.

The busy wave may be a frequency impressed on the "calling" or "disengaged" wave. Alternatively it may be a frequency separated by a fixed amount from the frequency of the "calling" or "disengaged" wave or a frequency impressed on this separated frequency.

When a frequency finder of a group seizes a channel the corresponding busy wave is at once emitted to prevent any other frequency finder of the group seizing the channel.

In the above, the operation of the frequency finder has been described in general terms as it has a number of different applications in a telephone system of the type described. Thus it may be used for finding a communication channel from a calling substation for the purpose of connecting this through to a wanted substation.

It may also be used as a discriminating finder in a large telephone exchange, that is to say, it may be arranged to respond only to the frequency of a calling substation which has been characterised in some way. Such characteristics may be permanently associated with a substation so as to indicate for instance, that it is a coin-box station, or may be associated with a substation under the control of the calling subscriber, by pressing a button for instance.

By the provision of discriminating finders it may thus be arranged that certain finders only accept calls from coin-box stations and other finders only accept calls from non-coin-box stations. It may also be arranged that for instance, certain finders only accept calls after a particular button has been pressed, thus effecting a degree of selection corresponding to the first digit of the number required.

It might also be used for finding a free communication channel of a group of communication channels for the purpose of extending a call in the forward direction .

The invention will be better understood from the following description of a method of carrying it out, described in connection with the seizing of a communication channel from a calling substation and shown in the accompanying drawings.

In the system shown in the drawings each communication channel has a "Go" frequency incoming to the finder and a corresponding "Return" frequency outgoing from the finder which are separated by a fixed amount constant throughout the system.

Figure 2:
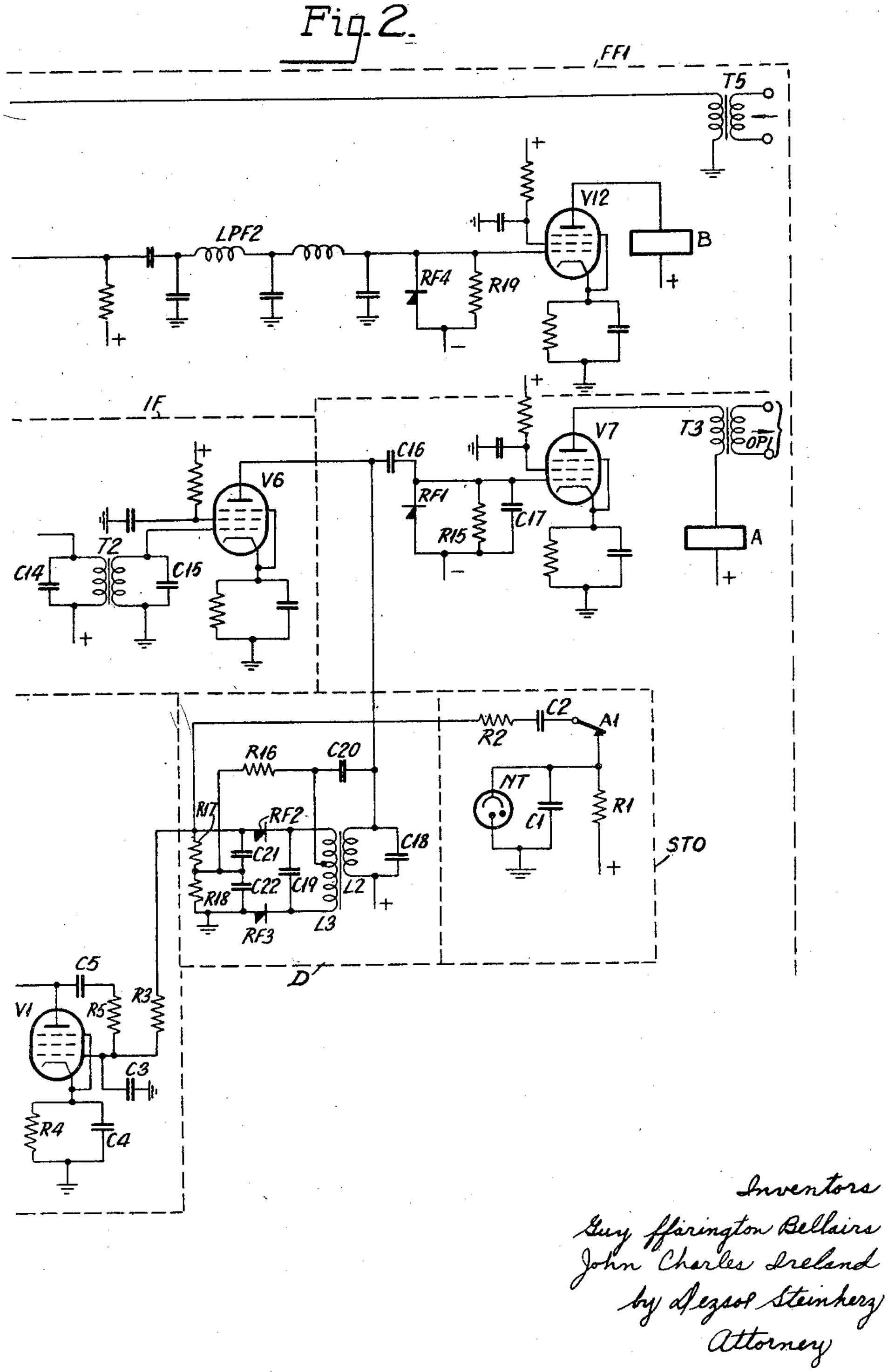

Figs. 1 and 2 when placed side by side show a frequency finder according to the invention connect in a telephone communication system having separate "Go" and "Return" transmission paths, CC1B and CC1A.

The transmission path CC1B (Fig. 1) is a coaxial cable over which a number of different carrier frequencies may be received, each corresponding to the send frequency of a substation.

When a subscriber at such a substation lifts his receiver, this characteristic carrier frequency is transmitted over the cable CC1B and reaches a central exchange via a transformer T1.

The transmission path CC1A is also a coaxial cable over which a number of different carrier frequencies may be sent out each corresponding to the receive frequency of a substation.

In the exchange there will be provided a number of frequency finders for hunting over a group of communication channels and one of these FF1 is shown.

The frequency finder FF1 may be considered as a wave testing device for testing the cable CC1B and a second wave testing device for testing the cable CC1A. As will be described a common generator supplies a wave of varying frequency to each of the two testing devices.

It is assumed that FF1 is the particular finder which is going to pick up the call and the equipment for doing so and the manner of operation will be described.

There will first be described in detail the arrangement for seizing a call made by a substation sending out its send or transmit frequency over the cable CC1B. This involves the wave testing device for testing the cable CC1B.

After that there will be described the necessary arrangements for preventing such a call from being seized in the event the corresponding substation receive frequency is simultaneously present on the cable CC1A. This involves the wave testing device for testing the cable CC1A.

A saw toothed oscillator STO comprises a neon tube NT across which is connected a capacitor C1. A positive anode potential is connected to the anode of the tube through a resistor R1 and the anode is connected via a large capacitor C2 and resistances R2 and R3 to the control grid of a valve V1 which is connected via a capacitor C3 to earth.

Valve V1 acts as a reactance valve for a variable frequency oscillator VO. The cathode of V1 is connected via biasing resistance R4, shunted by a capactitor C4, to earth; and the anode is connected to the anode of the valve V2 of the variable oscillator VO. The anode and the control grid of V1 are connected via a capacitor C5 and resistance R5.

The valve V2 is connected as an oscillator in the well-known "Hartley" circuit, whose frequency depends partly upon the reactance presented to it by the reactance valve V1.

With these connections the saw toothed oscillater STO will generate a saw tooth oscillation which controls the reactance of the reactance valve V1 and which in turn will vary the frequency generated by the variable oscillator VO periodically over a range. The saw tooth oscillator could of course be replaced by some other device for varying the frequency of the variable oscillator.

The variation in frequency that is obtainable by this means is normally only a small fraction of the mean frequency, and in order that the total frequency "range" or "excursion" shall be sufficient it is necessary to make the mean frequency very high and then to reduce the frequency of the oscillator output by a constant amount using the heterodyne principle to give the desired range. By such means a frequency variation of 2 or 3 to 1 may readily be obtained. This is achieved as follows:

The frequency generated by the valve oscillator VO is fed to the control grid of a mixer hexode valve V3 via a capacitor C7, the grid being connected via a resistance R7 to earth. The mixer grid of this valve is connected via a resistance R8 to earth and also via a capacitor C8 to a fixed oscillator valve V4. Valve 4 may be common to the exchange; its connections are in all wise similar to that of the valve V2 but its frequency is maintained constant.

The screen grid of valve V3 is connected via a capacitor C9 to earth and via a resistance R9 to positive anode potential. The cathode and suppressor grid are connected via a biasing resistance R10 shunted by a capacitor C10 to earth. Similar connections are made to all other pentode and hexode valves. The anode is connected via a resistance R11 to positive anode potential.

The frequency generated by the fixed oscillator is such that the range of beat frequencies produced at the anode of the mixer valve V3 gives the desired sweep range.

The anode of V3 is connected via capacitor C11 and a low pass filter LPF1 to the mixer grid of a hexode mixer valve V5, the grid being connected via resistance R12 to earth. The anode is connected via the primary winding of an intermediate frequency tuned transformer T2 to positive anode potential.

The control grid of mixer valve V5 is connected via the secondary winding of transformer T1 to earth.

The secondary tuned winding of transformer T2 is connected at one end to earth and at the other end to the control grid of an intermediate frequency amplifier valve V6.

Transformer T2 with capacitors C14 and C15 forms a band pass filter and with the amplifier valve V6 this band pass filter forms the intermediate filter device IF.

When now a frequency is fed into the mixer valve V5 by the incoming wave from a calling subscriber and the beat frequency fed from the mixer valve V3 is such that the resultant frequency at the anode of V5 falls within the pass band of the filter formed by the tuned transformer T2, a signal will be produced on the control grid of amplifier valve V6.

This signal amplified by the valve V6 in known manner will be fed via a capacitor C16 to one end of the detector circuit comprising rectifier RF1 shunted by resistance R15 and capacitor C17 and to the control grid of valve V7. The other end of the detector circuit is connected to negative potential.

The rectified signal amplified by the valve V7 will be passed via the primary winding of output transformer T3 to relay A, and also by the secondary winding of the transformer T3 to the output connection OP1.

Relay A will operate and at A1 disconnects the saw tooth oscillator STO; also at contact A2 of relay A the frequency from the mixer valve V3 will be disconnected from the second control grid of mixer valve V8, the functions of which will be described later, and connected to the second control grid of mixer valve V9. This frequency will appear in the anode of mixer valve V9 and will thus be transmitted via the transformer T4 to the outgoing transmission path TP2, also in the form of a coaxial cable, and to the mixer grid of mixer valve V10 for a purpose which will be described later.

The control grid of mixer valve V9 is connected to earth via the secondary of incoming transformer T5 whereby voice currents incoming over T5 will modulate the frequency returned over transmission path TP2 to provide return speech to the calling substation The details of the connection beyond the transformer T3 and T5 need not be described here.

At the same time as the signal from the anode of amplifier valve V6 is extended to the detector circuit it is also extended to a discriminator D which may be of the known type hereinafter described for the purpose of locking the variable oscillator to a frequency which will bring the frequency passing through the intermediate filter IF to a value near the centre of the pass band.

Two tuned circuits, one comprising inductor L2 and capacitor C18 and the other inductor L3 and capacitor C1 are tuned to resonance at the intermediate frequency. Inductors L2 and L3 are loosely coupled so that the resonant frequency of each tuned circuit is determined almost entirely by the impedances in that circuit alone. The signal is extended to the mid-point of L3 via a capacitor C20.

The mid-point of L3 is also extended via resistance R16 to the mid-point between two condensers C21 and C22 and two resistances R17 and R18 the other ends of which are in each case respectively connected to one side of rectifiers RF2 and RF3, the other sides of the rectifiers being respectively connected to the two sides of the inductor L3.

It will then be apparent that the voltage across each rectifier will be the vector sum of the signal voltage (supplied via capacitor C20) and the respective voltage across half of the inductor L3 due to the coupling between inductor L2 and inductor L3.

The combined output will be present across the combined resistance R17 and R18 one side of which is earthed and the other side connected via resistance R3 to the control grid of the reactor valve V1.

If the signal is at the exact intermediate frequency, then the rectified outputs from the two rectifiers RF2 and RF3 which appear in the form of steady and opposing potentials across R17 and R18 respectively, will cancel out. If the signal lies on one side of the intermediate frequency there will be a positive resultant voltage and if on the other side negative resultant voltage.

This control is applied to the reactor valve and will vary the frequency of the variable oscillator VO accordingly.

Thus if the discriminator D takes over when the variable oscillator is set at a frequency which does not bring the frequency extended to the intermediate filter device to near the middle of the pass band of the intermediate filter the frequency generated by the variable oscillator VO will be varied until the frequency produced approximates very closely to the correct intermediate frequency.

There will now be described the wave testing arrangement for testing the cable CC1A.

The control grid of mixer valve V10 is supplied with an oscillation at say 2,000 cycles from a valve oscillator V11 the circuit details of which are similar to those shown for the valve V2. The output of this mixer V10 thus comprises this frequency mixed with any frequencies present on transformer T4, i. e. any substation receive frequencies going out over the cable CC1A, one half of the secondary of which is as previously mentioned connected to the mixer grid of mixer valve V10.

The output from the anode of valve V10 is fed to the primary of a transformer T6 the secondary of which is connected at one side to earth and at the other to the control grid of mixer valve V8.

It will be noted that V10 and V11 with their associated circuits may be common to all the frequency finders in the group.

As previously mentioned in the absence of the operation of relay A the centre grid of mixer valve V8 is connected to the existing frequency obtained by beating the frequency of the variable oscillator VO with that of the fixed oscillator valve V4.

The output from the anode of valve V8 is taken via a low pass filter LPF2 which will pass frequencies below 2,000 cycles a shunt detector to second control grid of amplifier valve V12. The detector consists of the rectifier RF4 and resistance R19 in parallel the other side of the rectifier being connected to negative potential.

The anode of the valve V12 is extended to positive anode potential via a relay B.

If now the beat frequency applied to the mixer grid of valve V8 approaches a frequency which is present at the transformer T4, and is therefore present modulated with a frequency of 2,000 cycles per second at the control grid of valve V8, a resultant 2,000 cycle wave will pass the low pass filter LP2 and will cause the relay B to operate.

The operation of B will open the contact B1 thereby disconnecting the beat frequency from the mixer valve V5 and preventing any operation of relay A.

Thus if there is a substation receive frequency on the cable CC1A corresponding to the substation send frequency, which is being tested by the wave testing device which tests the cable CC1B, then the corresponding communication channel will not be seized as the wave testing device which tests the cable CC1A will also have produced a response.

It is of course necessary that the characteristics of low pass filter LP2 and the intermediate filter are so arranged that if there is an outgoing frequency on transmission path CC1A which corresponds to an incoming frequency on transmission path CC1B then as the frequency of VO approaches the appropriate value the relay B will be operated before relay A can have a change of operating. This may be achieved by suitably relating the band pass widths of the respective filters.

It will be understood that while relays such as A and B have been described as separate entities their functions might be effected electronically by suitable interconnection of the valves. Thus to replace relay B the cathode of the valve V12 might be connected via a resistance to a suppressor grid of the valve V6 which will be connected via a capacitor to earth. By this means when current flows in the valve V12 the functioning of valve V6 would be suppressed and there would be no current flow to operate the relay A. Relay A itself might be replaced in similar manner.

When the calling subscriber hangs up relay A will release and the frequency finder FF1 will be free to operate to pick up a further call.

It will be understood that if as previously mentioned a frequency finder is to be arranged to discriminate between calls and only pick up particular ones, e. g. calls originating in a coin-box substation in a telephone system, then when such a call is made an additional distinctive wave would be sent out over the channel and a third wave testing device either of one of the kinds previously described or in some other form might be provided in the discriminating frequency finder to test for this wave and means would be provided in the discriminating frequency finder for preventing the seizing of a communication channel unless a response was obtained from the third wave testing device.

We claim:

1. In a telecommunication system an arrangement for hunting over a plurality of "go" and "return" communication channels on a transmission path comprising a variable frequency oscillator by which waves are produced which vary within a predetermined time over a range dependent upon the carrier frequencies of said communication channels, mixing means by which the wave produced by said oscillator is combined with carrier waves characterising the "go" side of the communication channels to produce a resultant frequency, further mixing means by which the wave produced by said oscillator is combined with carrier waves characterising the "return" side of the communication channels to produce another resultant frequency, arresting means for causing the variable frequency oscillator to produce any desired frequency, a first responding means responsive to said first resultant frequency when the frequency of the wave produced by the oscillator approaches within a predetermined amount of the frequency of a wave present on the "go" side of a communication channel for causing said arresting means to become effective to cause said variable frequency oscillator to produce a fixed frequency having a predetermined relation to the frequency of the wave found present on the "go" side of the communication channel, preventive means which operate to prevent the arresting means becoming effective and a second responding means responsive to waves of said other resultant frequency on the "return" side of a communication channel when the frequency of the wave produced approaches within an amount predetermined in value and greater than said first mentioned predetermined amount of the frequency of a wave present on the "return" side of the communication channel to operate said preventive means whereby the variable frequency oscillator is not arrested in the absence of a wave on the "go" side of a communication channel or in the presence of a wave in the "go" side of a communication channel if there is a corresponding wave present on the "return" side of a communication channel but is operated if there is a wave present on the "go" side of a communication channel and no corresponding wave present on the "return" side of a communication channel.

2. In a telecommunication system an arrangement as claimed in claim 1, in which separate transmission paths are provided for the "go" and "return" sides of the communication channels.

3. In a telecommunication system an arrangement as claimed in claim 1, in which the first responding means in responding to a wave on the "go" side of a communication channel causes the oscillator to produce a wave having a definite frequency relation to that of the said wave.

4. In a telecommunication system an arrangement as claimed in claim 1, in which the first responding means is arranged to set up a wave on the "return" side of the communication channel when responding to a wave on the "go" side of the same channel.

5. In a telecommunication system an arrangement as claimed in claim 1, in which the transmission path is connected to a number of substations and the substation initiating a call sends out a wave having a frequency characteristic of the substation on the "go" side of a communication channel.

6. In a telecommunication system an arrangement for hunting over a plurality of communication channels wherein the condition of a channel is indicated by waves having frequencies assigned exclusively to said channel comprising a wave testing device which responds to a wave on a communication channel indicating a busy condition, a second wave testing device which responds to a wave on a communication channel indicating a calling condition, means for enabling both said wave testing devices to test the "go" and "return" sides of a communication channel substantially simultaneously and means operable when the second wave testing device is operated and the first wave testing device is unoperated for selecting and setting up a connection to the selected communication channel.

7. An arrangement as claimed in claim 6, in which separate incoming and outgoing carrier waves are provided for each communication channel and in which the first wave testing device is arranged to test the outgoing carrier waves for the busy condition of a channel.

8. An arrangement as claimed in claim 7, in which the wave to which the first wave testing device responds is the carrier wave of the outgoing communication channel.

9. In a telecommunication system an arrangement for hunting over a plurality of communication channels wherein the condition of a channel is indicated by waves having frequencies assigned exclusively to said channel comprising two wave testing devices, a generator for supplying both said wave testing devices with a wave of varying frequency to cause one of said wave testing devices to test for the presence of a "calling" wave on each communication channel successively and the other of said wave testing devices to test for the presence of a busy wave on the same communication channels so that each communication channel is tested substantially simultaneously, and means operable when a wave testing device is operated in response to a calling wave and the other wave testing device is not operated by a busy wave, for selecting and setting up a connection to a communication channel responsive when a communication channel is tested by said wave testing devices and a respone is obtained from the calling wave testing device and not from the busy wave testing device.

10. An arrangement as claimed in claim 9, in which when the testing device for the calling wave produces a response the frequency of the wave from the generator is made to set itself to a value having a fixed relation to the frequency of the wave causing the response.

11. An arrangement as claimed in claim 10, in which the generator supplies a "busy" wave, which is connected up when the testing device for the "calling" wave responds.

12. An arrangement as claimed in claim 11, in which the "busy" wave is connected up via a mixer to which speech currents in the return direction are adapted to be fed.

13. In a telecommunication system an arrangement for hunting over a plurality of communication channels wherein the condition of each channel is indicated by waves having frequencies assigned exclusively to said channel, comprising a valuable frequency generator, two wave testing devices to which waves are fed by said valuable frequency generator to enable said devices to successively test said channels one of which tests for the presence of a "calling" wave and the other tests for the presence of a corresponding "busy" wave, control means whereby the testing device testing for a "busy" wave is made effective to produce a response slightly earlier than the testing device testing for the corresponding "calling" wave and means operative to seize a communication channel after testing by causing a wave of fixed frequency to be applied thereto if a response is obtained from the "calling" wave testing device and not from the "busy" wave testing device, and arresting means operative when the test device for the "busy" wave produces a response for suspending the functioning of the testing device for the "calling" wave.

14. In a telecommunication system an arrangement for hunting over a plurality of communication channels wherein the condition of each channel is indicated by waves having frequencies assigned exclusively to said channel, comprising a valuable frequency generator, two wave testing devices to which waves are fed by said valuable frequency generator for successively testing said channel one of which tests for the presence of a "calling" wave and the other tests for the presence of a corresponding "busy" wave, means operative to seize a communication channel after testing by causing a fixed frequency wave to be applied thereto if a response is obtained from the "calling" wave testing device and not from the "busy" wave testing device means for generating waves for application to transmission channels when busy, and means responsive to the testing device testing for the "calling" or "disengaged" wave for disconnecting, the testing device for testing for the corresponding "busy" wave and for connecting up said generating means to cause the corresponding "busy" wave to busy the communication channel.

GUY FFARINGTON BELLAIRS.
JOHN CHARLES IRELAND.

REFERENCES CITED

The following references are of record in the file of this patent:

UNITED STATES PATENTS

| Number | Name | Date |
|---|---|---|
| 2,107,168 | Tidd | Feb. 1, 1938 |
| 2,143,163 | Monk | Jan. 10, 1939 |
| 2,155,176 | Wicks | Apr. 18, 1939 |
| 2,287,925 | White | June 30, 1942 |
| 2,337,878 | Espenchied | Dec. 28, 1943 |
| 2,387,018 | Hartley | Oct. 16, 1945 |
| 2,408,085 | Meacham | Sept. 24, 1946 |
| 2,440,239 | Almquist | Apr. 27, 1948 |

OTHER REFERENCES

Article by D. A. Bell; Wireless Engineer, Nov. 1942, pages 497–502.